United States Patent [19]
Cotner et al.

[11] Patent Number: 5,884,327
[45] Date of Patent: Mar. 16, 1999

[54] SYSTEM, METHOD AND PROGRAM FOR PERFORMING TWO-PHASE COMMIT WITH A COORDINATOR THAT PERFORMS NO LOGGING

[75] Inventors: Curt Lee Cotner, Gilroy; Richard Anthony Crus; Brian Keith Howell, both of San Jose; James Willis Pickel, Gilroy; David Joseph Wisneski, Morgan Hill, all of Calif.

[73] Assignee: International Business Machines Corporation, Armonk, N.Y.

[21] Appl. No.: 719,523

[22] Filed: Sep. 25, 1996

[51] Int. Cl.⁶ .................................................. G06F 17/00
[52] U.S. Cl. ...................... 707/202; 707/204; 707/201; 707/8
[58] Field of Search .......................................... 707/1–206

[56] References Cited

U.S. PATENT DOCUMENTS

| | | | |
|---|---|---|---|
| 4,648,031 | 3/1987 | Jenner | 364/200 |
| 4,819,159 | 4/1989 | Shipley et al. | 364/200 |
| 5,327,532 | 7/1994 | Ainsworth et al. | 395/200 |
| 5,371,886 | 12/1994 | Britton et al. | 395/600 |
| 5,586,312 | 12/1996 | Johnson et al. | 707/10 |
| 5,586,329 | 12/1996 | Knudsen et al. | 707/100 |
| 5,594,329 | 1/1997 | Knudsen et al. | 707/2 |
| 5,625,811 | 4/1997 | Bhide et al. | 707/2 |

OTHER PUBLICATIONS

Jefferey Ullman, Principles of Database And Knowledge–Base Systems, pp. 560–564, 586, 1988.

"Recovery Protocol Using A Common Log", P. Homan, B.G. Lindsay, R.L. Obermarck, IBM Technical Disclosure Bulletin, vol. 24, No. 11B, Apr. 1982, pp. 6211–6212.

"Presumed Abort Protocols", B. Lindsay, C. Mohan, IBM Technical Disclosure Bulletin, vol. 26, No. 7A, Dec. 1983, pp. 3379–3381.

"Two–Phase Commit Optimizations in a Commercial Distributed Environment", G. Samaras, K. Britton, A. Citron, C. Mohan, Distributed and Parallel Databases 3, 325–360 (1995).

"Systems Network Architecture", Lu 6.2 Reference: Peer Protocols, IBM Document No. SC31–6808–1, Jun. 1990, Chapter 8.

*Primary Examiner*—Thomas G. Black
*Assistant Examiner*—David Yiuk Jung
*Attorney, Agent, or Firm*—Gates & Cooper

[57] ABSTRACT

The system, method, and program of this invention allows a two-phase commit protocol to work properly, even when the client acting as the coordinator does not have a log to record two-phase state information. In a preferred embodiment, the client in a client/server distributed transaction processing system is a personal computer. The client, without a recovery log, acts as a coordinator of a commit process. The coordinator migrates, i.e., passes, responsibility for resynchronization, and any associated logging requirement, to a server, e.g., to any of the connected relational database management system (RDBMS) servers, which is a participant in the transaction. The server uses its own recovery log for use in satisfying the logging requirement.

51 Claims, 12 Drawing Sheets

SYSTEM, METHOD AND PROGRAM FOR PERFORMING TWO-PHASE COMMIT WITH A COORDINATOR THAT PERFORMS NO LOGGING

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to distributed transaction processing in a client/server environment, and more specifically, to a two-phase commit protocol that is used to ensure data consistency among participants in a transaction.

2. Description of the Related Art

Managing a database of substantial size with substantial functionality typically requires that a database management system (DBMS run on a server machine with significant processing power, working memory, and storage capacity, e.g., the IBM AS 400, Risc System 6000, or a larger machine such as a mainframe, e.g., the IBM System 390. It is not uncommon for a database to be distributed amongst several machines or to require access to several databases running on one or more machines. Transactions against the database(s) can originate from a same machine running a DBMS or another machine, i.e., a client machine, which is connected via a network, e.g., in a distributed or client/server environment, to the DBMS server machine. Such a client machine may be a smaller computer, such as a personal computer, e.g., the IBM PS/2, without any database resources of its own. The client machine can originate transactions in such a distributed or client/server environment. The client interacts, through updates and retrievals, with the data in the database over the network to the DBMS on the server machine.

A transaction (or logical unit of work, LUW) consists of a set of operations that are executed to perform a particular logical task, such as making changes to data resources such as databases or files. A distributed transaction is the execution of one or more statements that access data distributed on different systems. The changes to the resources must be committed or aborted before the next transaction in the series can be initiated. A distributed commit protocol is required to ensure that the effects of a distributed transaction are atomic, i.e., either all the effects of the transaction persist or none persist, whether or not failures occur.

A well-known commit protocol is the two-phase commit protocol. This protocol ensures that all participants commit if and only if all can commit successfully. In a client/server environment, the participants have fixed requester-server roles. Servers initiate no work unless the requester asks for it. Typically, the client is the coordinator, and the participants are the servers.

FIG. 1 shows a time sequence of the two-phase commit protocol for a coordinator 10 with one participant 12. During the first phase, i.e., a voting phase, the coordinator 10 of the commit protocol, asks all of the other participants 12 to prepare to commit 1. Each participant replies whether it can guarantee that it can perform the outcome requested by the coordinator; the reply 3 is "yes" if it can. If a participant is unable to prepare to commit for any reason, the reply is "no." During the second phase, the decision phase, the coordinator propagates the outcome 5 of the transaction to all participants. If all of the participants replied yes during the first phase, the commit outcome is propagated; if any participant replied "no," the abort outcome is propagated. Once the participant either commits or aborts the transaction, the participant 12 sends an acknowledgement 7 back to the coordinator.

During this two-phase commit, each participant writes to a log that it maintains in order to be able to back out any action if the action has to be aborted. A log is a file in non-volatile storage that maintains two-phase state information. The log can be used to figure out how to return resources to consistent states after a failure. The log is read after a failure in order to perform resynchronization. Information that is vital for correct processing after a system failure must be the subject of a forced log write. However, forced writes are not required when the logged information can be recreated after a failure by recovery processing.

Forced write and nonforced write are two ways to write information to nonvolatile storage. A forced write operation does not complete until the information is written to nonvolatile storage. A nonforced write completes when the information is put into volatile storage. Forced write operations take longer to complete, but the information is guaranteed to be available following a failure. Nonforced writes complete more quickly than forced writes, but the information is not guaranteed to be available after a failure, since the failure could have caused the information to be lost while it was still in volatile storage. Since log data still in volatile storage is written to nonvolatile storage when a later log force occurs, completion of a forced write implies that data from all previous nonforced writes have been moved to nonvolatile storage. Nonforced data may also be written to nonvolatile storage when the log manager needs to move log records out of volatile storage for an implementation-defined reason, such as when the volatile buffer pool is full.

Again, with reference to FIG. 1, during the first phase of the two-phase commit protocol, i.e., the voting phase, after a coordinator asks all of the participants to prepare to commit 1, a participant 12 force-writes a prepared log record 2 that ensures that it can successfully commit or abort the transaction, even if a system failure causes it to lose working memory of the transaction. Thus a DBMS acting as a participant forces enough information so that it can either recreate or undo the changes made during the transaction. A client force writes enough information so that it can initiate recovery processing following a failure, information including identity of the coordinator and the state of the two-phase commit operation.

A "yes" vote 3 puts the participant in an in-doubt state, implying that it cannot commit or abort the transaction without an explicit order from the coordinator. If a participant 12 decides to abort the transaction, it force-writes an abort log record and sends a "no" vote to the coordinator. A "no" vote defines the outcome of the transaction so that the participant voting "no" does not have to wait for an explicit order from the coordinator. The participant aborts the transaction, releases all of its locks, and forgets the transaction.

The second phase of the two-phase commit, the decision phase, begins after the coordinator receives all of the votes from the participants. If all the votes received are "yes", the coordinator must decide whether to commit or abort. The coordinator propagates its decision to the participants. If at least one of the votes is "no", the decision to abort can be propagated by the coordinator to only those participants that voted "yes" since the participants voting "no" already know the outcome.

Because the coordinator's decision needs to survive failures, a commit or abort log record is force logged, 4 (FIG. 1), before the decision is propagated to the participants. The completion of the force-write takes the transaction to the committing or aborting state. After receiving the commit or abort decision, each participant moves into the committing/aborting state, force-writes a commit/abort log record 6 to ensure that the transaction will be committed/aborted, and then sends and acknowledgment (ACK) message 7 back to the coordinator indicating that the participant will commit/abort as the coordinator requested. The participant then commits/aborts, and forgets about the transaction. The coordinator, after receiving acknowledgment messages form all participants that voted YES, writes a non-forced END log record 8 and forgets the transaction. The END log record indicates that all participants have successfully completed the commit processing and thus, no recovery processing is required if a failure occurs.

There are many problems that can occur with the above-described two-phase commit protocol that can lead to inefficient and unreliable transaction processing. Some of the problems are a result of the amount of network traffic, including the number of messages involved across the network amongst the participants and the coordinator and the delays in the messages across the network. Other problems arise because of the resource locking during the two-phase commit procedure, the number of log writes, and the failures or power outages at one or more of the participants or within the network. As a result, various techniques have been used to optimize different aspects of the two-phase commit procedure in order to minimize these problems.

There are basically two optimization approaches that have been taken. One approach focuses on improving performance in failure cases by streamlining recovery processing at the expense of extra processing in the normal case. Another approach focuses on improving performance in the normal case because networks and systems are becoming increasingly more reliable and there is a need to support high-volume transactions by having a streamlined protocol for the normal case. See,"Two-Phase Commit Optimizations in a Commercial Distributed Environment", George Samaras, Kathryn Britton, Andrew Citron, C. Mohan, *Distributed and Parallel Databases,* 3, pages 325–360, Kluwer Academic Publishers, Boston, Manufactured in The Netherlands, 1995. Some examples of streamlining the two-phase commit protocol for the normal case are given below.

For example, the two-phase commit protocol involves network traffic to convey responses between the participants and the coordinator. Any message that is sent over the network slows down the commit protocols since it adds network transit delays. It is known to optimize the two-phase commit protocol by reducing the commit time by reducing the number of messages sent or by sending messages to different participants in parallel.

Another optimization technique is to minimize the number of times a log write is forced. A forced log entry slows down commit processing because the system waits until the entry is written to nonvolatile storage. Minimizing forced log writes and conducting extra recovery processing to regain the lost information is one way to optimize the normal, non-failure case rather than the failure case.

Another optimization technique is called Presumed Abort (PA). Presumed Abort is an extension of the basic two-phase commit protocol, and is now part of the ISO-OSI and X/Open distributed transaction processing standards. Presumed Abort reduces the number of forced log writes and provides optimizations that reduce the number of network message flows. FIG. 2 shows a transaction that aborts 5, followed by a participant failure 18. Unlike the standard two-phase commit, a Presumed Abort two-phase commit does not log before sending the Prepare message. Unlike the standard two-phase commit, a participant does not have to force write an abort record 6 (FIG. 1) before acknowledging 7 (FIG. 1) an abort command. If a prepared record 2 is found on its log after a crash 18, the participant initiates recovery processing with its coordinator 10. Similarly, the coordinator does not have to force write the abort record 4 (FIG. 1). If the coordinator has no information about the transaction on its log, it presumes that the transaction aborted and tells the subordinate to abort 5; hence the name Presumed Abort. The server 12 initiates recovery processing 21 when it finds itself in doubt after a failure. This is necessary since the coordinator may have no memory of the transaction if it also failed. This is different to the two-phase commit coordinator which is responsible for initiating recovery and therefore must force an abort log record 4 (FIG. 1) before sending the abort message to the subordinate. The presumed abort coordinator performs no logging at all in this case, since the participant can initiate recovery. The Presumed Abort includes the read-only and leave-inactive-partners-out optimizations discussed below.

In a "read-only" optimization technique, a participant in a transaction that has not performed any updates is allowed to vote "read-only" in the voting phase. The vote implies that the effects of commit and abort outcomes would be identical for that participant. The participant is left out of the second phase of the commit processing and avoids any log writes. A participant is allowed to vote "read-only" if and only if all of its subordinates have voted read-only; otherwise, it needs to learn the outcome in order to propagate it to subordinates that did not vote read-only. For environments that are dominated by read-only transactions, this optimization provides enormous savings, since it reduces the commit operation to a one-phase commit operation. The Presumed Abort performs no logging at all if all participants vote read-only. FIG. 3 illustrates the read-only optimization with the Presumed Abort protocol since participant B, 14, does not force write a prepared log prior to sending its read-only vote 33.

In environments where servers respond only to requests and do not initiate any work of their own, such as in a client/server environment, commit processing can be optimized by leaving out members that have not participated in a transaction from the two-phase commit protocol. This optimization technique is referred to as "leaving inactive partners out" or "OK-TO-LEAVE-OUT". During a normal two-phase commit operation, the coordinator includes all members, whether or not they have participated in an exchange of data during the transaction. With the OK-TO LEAVE-OUT optimization technique, a coordinator leaves out any member with which it has exchanged no data during the transaction. When a member is left out, the coordinator does not send it the Prepare to Commit messages; nor does it have to wait for the VOTE or ACK replies. This optimization technique is easy to include in the Presumed Abort optimization since the Presumed Abort technique is based on a requester-server, i.e., client/server, model.

Several of the optimization techniques discussed above have limited application, that is, there are certain conditions that must be met before they can become effective. For example, some of the techniques are only useful if a participant is inactive or has performed read-only operations. Also, these techniques may reduce the amount of logging that a participant has to do, but they do not necessarily eliminate logging by a coordinator in all circumstances. For example, in the Presumed Abort technique, the coordinator does not perform any logging 20 (FIG. 2), i.e., does not have to force-write the abort record, only when an abort decision is going to be sent. The coordinator still has to log if a commit decision is sent.

However, in some cases, such as in a client/server environment, a database client/coordinator may not have the resources, or may not provide a secure environment, that allows a log to be maintained. For example, such database clients can reside on personal computers which are not maintained by an administrator and which are not secure. In this environment, the probability of a log being broken, deleted, or unavailable is high. Such local log failures can include, among others, a powering off by the client, a failure of the client's hard disk, network failures between the client and a DBMS server, intermittent outages caused by mobile computing, and accidental erasure of the log. When a two-phase client with a local log fails, database management system (DBMS) servers are exposed to data outages if the current two-phase commit protocol is being used.

If one or more systems involved in a transaction fails and/or a log is deleted or broken during a two-phase commit operation, database integrity is compromised. There can be substantial delays before the operation completes; and the affected resources are not available for use by other transactions. If resynchronization can not be performed, database resources could be locked indefinitely.

In systems having high frequency of transactions, such delays are unacceptable. If this does occur, in some systems, a database administrator is given a way to manually determine the outcome of the commit and to manually force a blocked transaction to commit or rollback. The administrator has to make a choice as to whether to commit or abort the changes to the affected data resources. Once a two-phase commit operation has started, either choice runs the risk of causing heuristic damage, that is, of making the local resources abort when the rest of the transaction commits, or vice versa. This may cause the database resources to be in an inconsistent state. In other systems, such as those where the client is a personal computer, there may not be an administrator to even manually attempt to correct the problem.

SUMMARY OF THE INVENTION

It is an object of this invention to eliminate the exposure of a local log failure of a client/coordinator while still allowing database resources to be protected by a two-phase commit.

It is a further object of this invention to remove the requirement that a client must have a log to perform a two-phase commit procedure when a client's log has a high probability of being broken, deleted, or unavailable.

It is a further object of this invention to keep clients, which execute applications involving distributed recoverable resources, from having to install a transaction monitor and maintain a persistent log for distributed recovery operations.

The system, method, and program of this invention allows a two-phase commit protocol to work properly, even when the client acting as the coordinator does not have a log to record two-phase state information. The client, without a recovery log, acts as a coordinator of a commit process, i.e., the client coordinates the two-phase commit processing independently of the logging required to guarantee the outcome of the unit of work. The coordinator performs no logging (i.e., coordinates independently of logging), even when one of the participants to the transaction votes to commit. The coordinator migrates, i.e., passes, responsibility for resynchronization, and any associated logging requirement, to a server, e.g., to any of the connected relational database management system (RDBMS) servers, which is a participant in the transaction. The server uses its own recovery log for use in satisfying the logging requirement.

More specifically, before a client/coordinator initiates the two-phase commit procedure, the coordinator migrates resynchronization responsibilities. One of the connected DBMS servers is chosen to perform resynchronization on behalf of the coordinator. The chosen DBMS server is called the "resync server." The resync server only coordinates resynchronization and does not coordinate the two-phase commit operation. A migrate resync message is sent to the resync server. The resync server replies with the resync migrated message. If a failure occurs sending the resync migrated message, the unit of work is rollbacked and forgotten.

The coordinator initiates the two-phase commit by sending a prepare to commit message to all participants, except the resync server. The prepare to commit messages include the network address of the resync server to be used to perform resynchronization if the commit fails. After the coordinator receives the votes from all the participants, it sends the outcome (commit or rollback) of the first-phase to the resync server along with a list of all the DBMS servers that voted request to commit. If all participants voted forget, each DBMS server is read-only and does not participate in the second phase of commit, and the coordinator sends the request to commit message to the resync server with an empty list of DBMS servers that voted request to commit.

If the resync server receives a request to commit message, the resync server force-writes a commit log record with the list of participants participating in the two-phase commit. A committed message is sent to the coordinator. If the resync server receives a rollback message, the resync server writes a non-forced rollback log record. No reply to the coordinator is required.

In the second phase of commit processing, the coordinator sends each of the participants, except the resync server, an appropriate message as follows. If a committed message is sent, the participant force-writes a commit log record, and sends a forget message, either implied or explicit, to the coordinator. An explicit forget message is optional. The coordinator can choose to have the participant use an implicit forget where the next reply message implies the forget. The participant then commits the unit of work, and forgets it. After receiving the responses from all the participants, the coordinator sends a forget message to the resync server. The resync server writes a non-forced forget log record, and forgets the unit of work. If a rollback message is sent, the participant writes a non-forced rollback log record, rollbacks the unit of work, and forgets it. No reply to the coordinator is required.

BRIEF DESCRIPTION OF THE DRAWING

For a more complete understanding of this invention, reference is now made to the following detailed description of the embodiments as illustrated in the accompanying drawing, wherein.

DETAILED DESCRIPTION OF THE PREFERRED EMBODIMENTS

Figure 1:
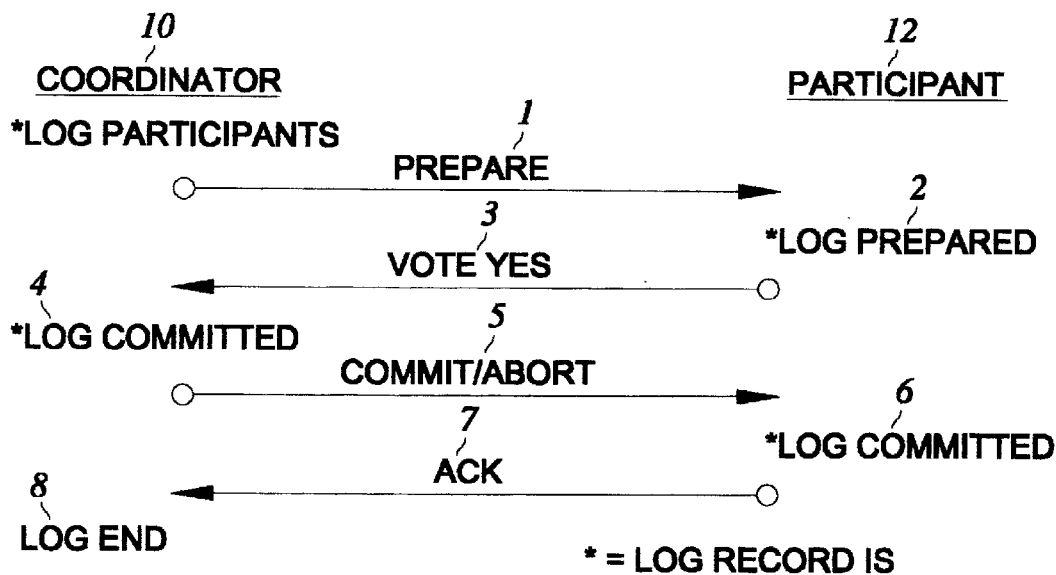
FIG. 1 shows a time sequence of a prior art two-phase commit protocol.
Figure 2:
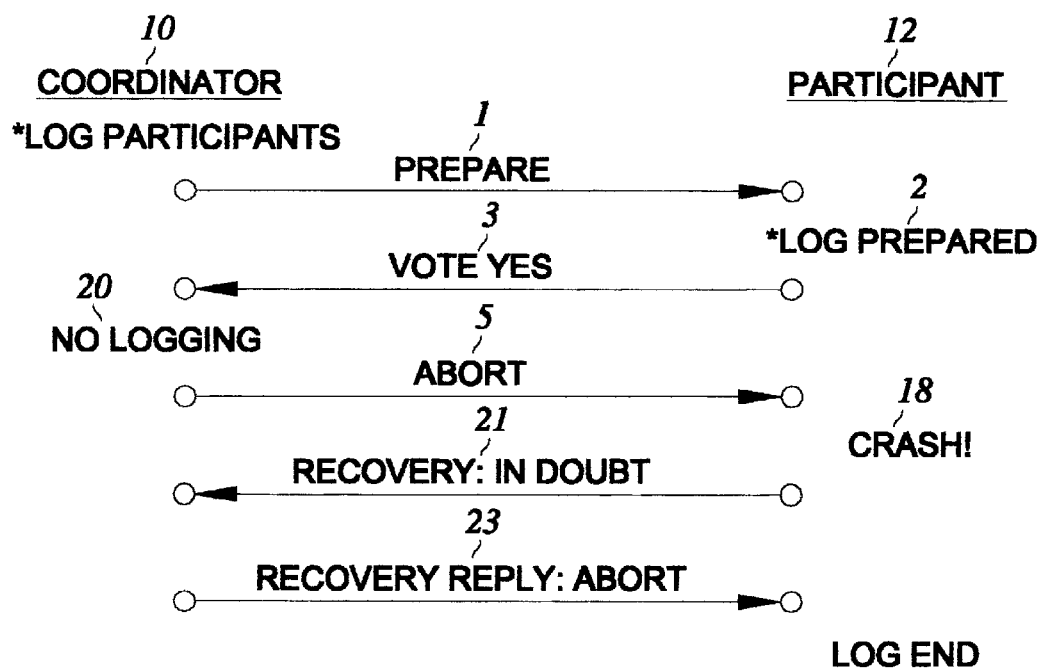
FIG. 2 shows a transaction that aborts, followed by a participant failure, in a Presumed Abort optimization technique.
Figure 3:
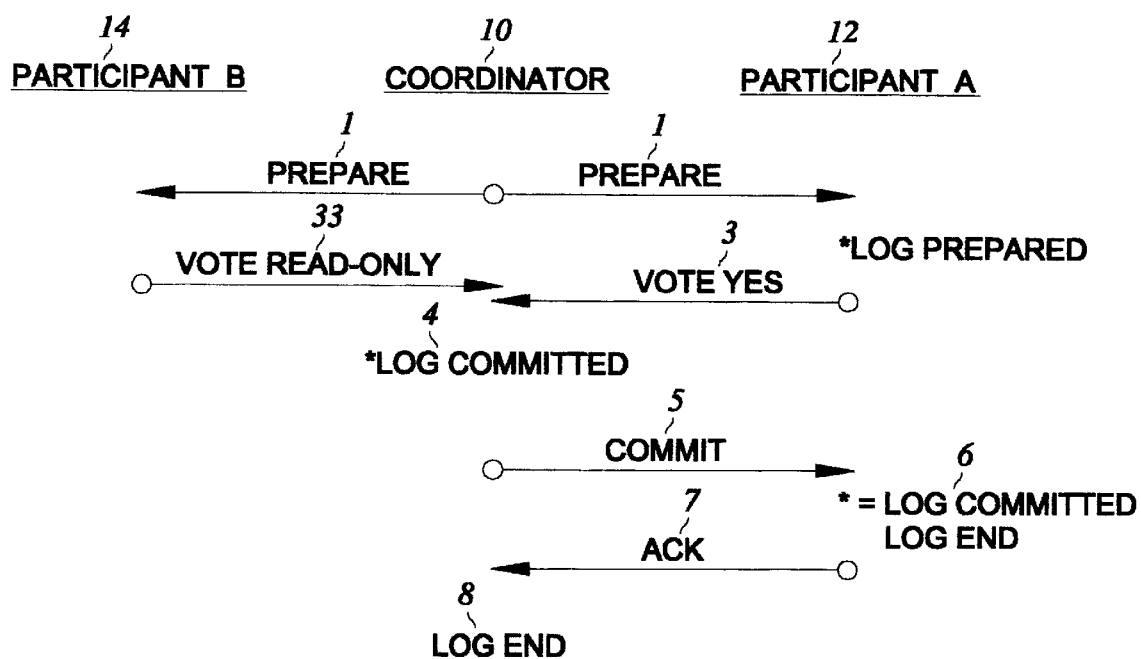
FIG. 3 illustrates the read-only optimization with the Presumed Abort protocol.
Figure 4:
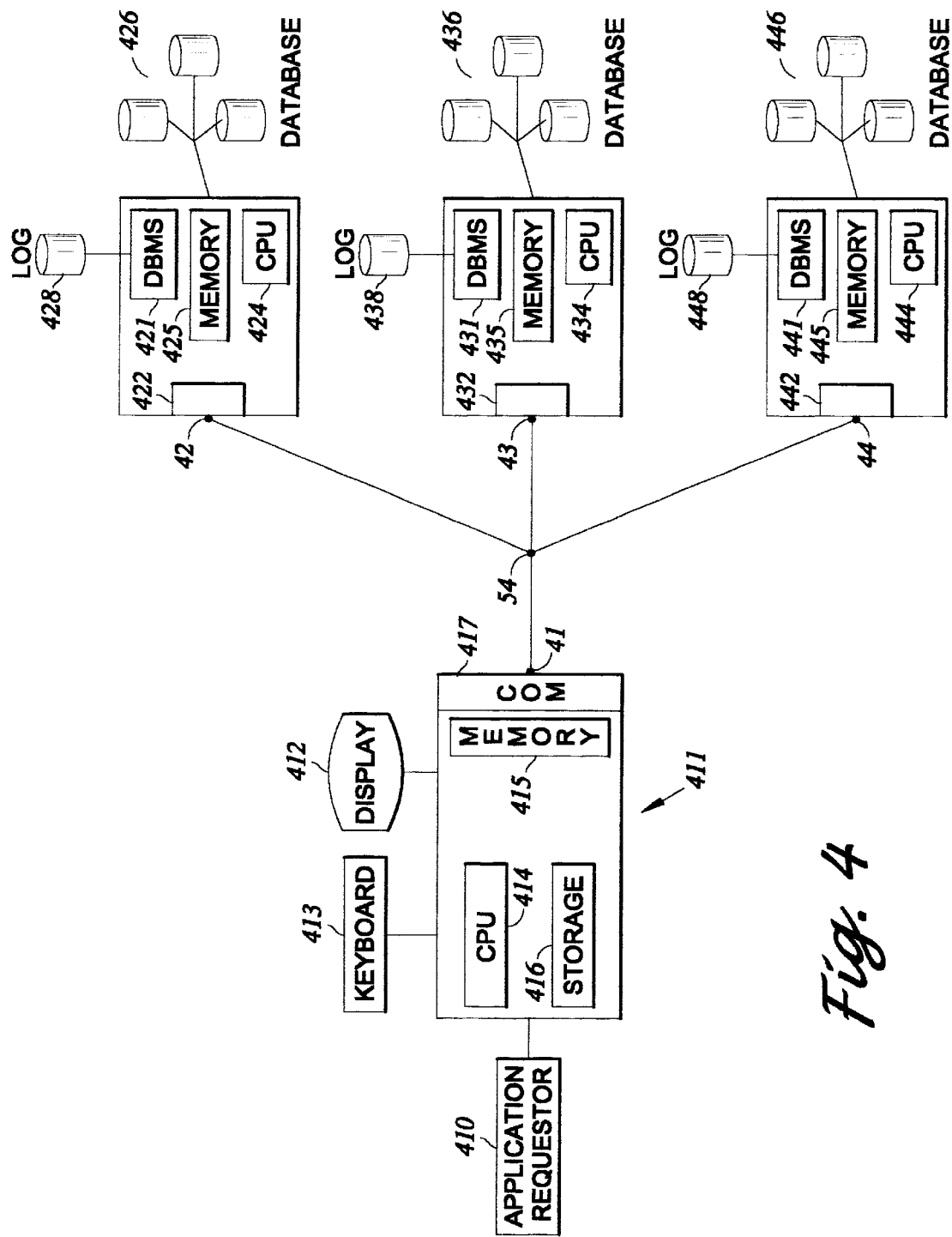
FIG. 4 shows a client/server distributed transaction processing system environment of a preferred embodiment of this invention.

In the client/server environment of FIG. 4, there are computing nodes 41, 42, 43, 44 linked by a communication network 54. The nodes of the system cooperate with each other in order to process transactions that originate at one node 41 but are managed by a database management system server 421, 431 at another node, 42, 43. The nodes cooperate with each other by communicating via the communications network 54 through an exchange of messages. The means 422, 432, 442 for sending and receiving messages may include well known message passing techniques or the use of shared disk or shared memory techniques.

As shown in FIG. 4, the application requester 410 is an application running on a personal computer 411, such as an IBM PS/2 having a display 412, keyboard 413, cpu 414, memory 415, storage such as hard drives 416 and a communication port 417. For this invention, the client machine does not have any local resources, i.e. database files or records, to manage, protect, or maintain. The DBMS servers are computer systems which have access to external storage 426, 436, 446 for storing the database and storage 428, 438, 448 for maintaining a log. The systems also have one or more cpu's 424, 434, 444, and memory 425, 435, 445. The systems may or may not have various input/output devices.

Various changes can be made to the system environment without affecting the breadth and scope of the invention. For example, multiple database management systems could run on the same machine, or there may be one or more databases distributed across multiple systems. A sysplex machine environment may also be utilized. In addition, the communication links between the systems may vary in configuration and may adhere to any one of a number of network protocols. Although in the preferred embodiment of the invention the DBMSs are relational database management systems, the invention is applicable to other database management systems such as object-oriented database management systems, etc.

In a preferred embodiment, application requesters and servers adhere to the Distributed Relational Database Architecture (DRDA) as described in IBM Distributed Relational Database Architecture Reference, Second Edition, March 1993, IBM, SC26-4651-01, and as licensed from IBM. A DRDA application requester divides the distributed transaction into discrete, synchronized units of work (UOW), delimited by commit points (SQL COMMIT). A two-phase commit allows an application requester 41 and application servers 42, 43 processing a distributed transaction to coordinate error recovery and maintain consistency among distributed resources such as SQL tables. Any changes to a protected resource are logged so that they can be either rolled back, if the application or any application server detects an error, or committed. When a transaction is committed, all changes among the application servers participating in the UOW are guaranteed to persist after any type of error.

Coordinated error recovery is performed when an application requester or application server does not know the outcome of a unit of work because an error occurred that prevented the two-phase commit protocol from completing. After recovering from the failure, the unit of work is completed by connecting to the application requester or application server and performing resynchronization.

When an application commits a unit of work, the application requester and all application servers participating in the unit of work carry out a two-phase commit protocol. The two-phase commit protocol of this invention utilizes a Presumed Abort optimization technique which provides the ability for clients without a log to migrate resynchronization responsibilities to another participating server. To provide the functionality described herein, the preferred embodiment assumes DRDA supports the Presumed Abort protocol.

The system, method, and program of this invention addresses the situation where an application requester may not have the resources or provide a secure environment to support resynchronization (e.g. a Windows or DOS client). Resynchronization requires a log which must persist over time. If a log is deleted, databases are exposed to data integrity problems. To support two-phase commit for an application requester/coordinator with no log, resynchronization responsibilities are migrated to an application server, called the resync server. If a failure occurs during commit, the resync server performs resynchronization flows on behalf of the application requester.

FIG. 4 shows the system environment in performing a two-phase commit at a client without a log. A client 410 resides on a personal computer at node 41, where there is no local DBMS that has a log and where the client can connect to many different DBMS servers 42, 43. In the preferred embodiment, no DBMS server 42, 43 can be designated as the coordinator. Before the coordinator 410 at the client 41 initiates the two-phase commit protocols, a connected DBMS server 43 is chosen to perform resynchronization on behalf of the coordinator 410 in the event of a failure. The coordinator 410 migrates the resynchronization responsibilities to the DBMS server 43 by sending a migrate message.

During the two-phase commit, the DBMS server 43 performs the logging that is normally performed (prior to this invention) by the coordinator and performs the appropriate resynchronization if the client 41 or a DBMS server 42 fails.

Figure 5A:
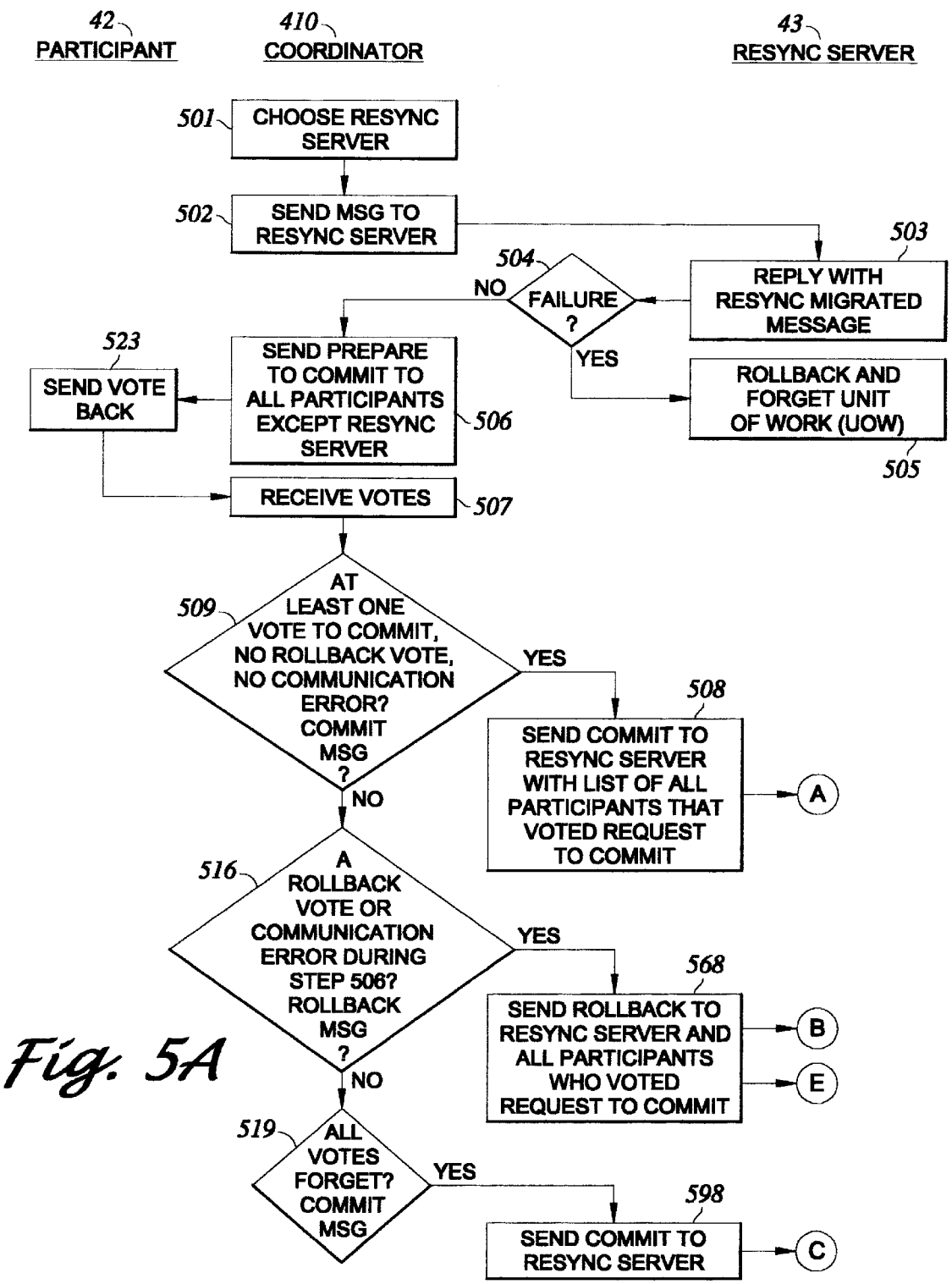
FIGS. 5A, 5B and 5C illustrate the method and program steps of the system components during the first phase of the two-phase commit processing.
Figure 5B:
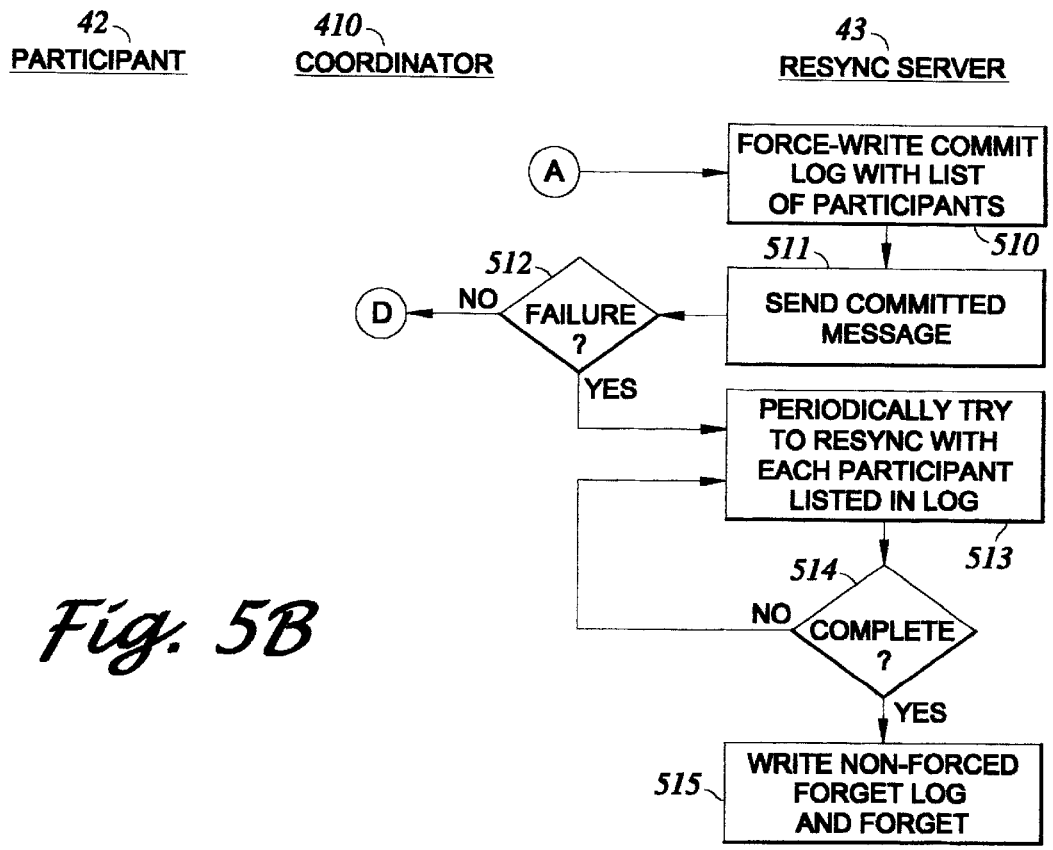
Figure 5C:
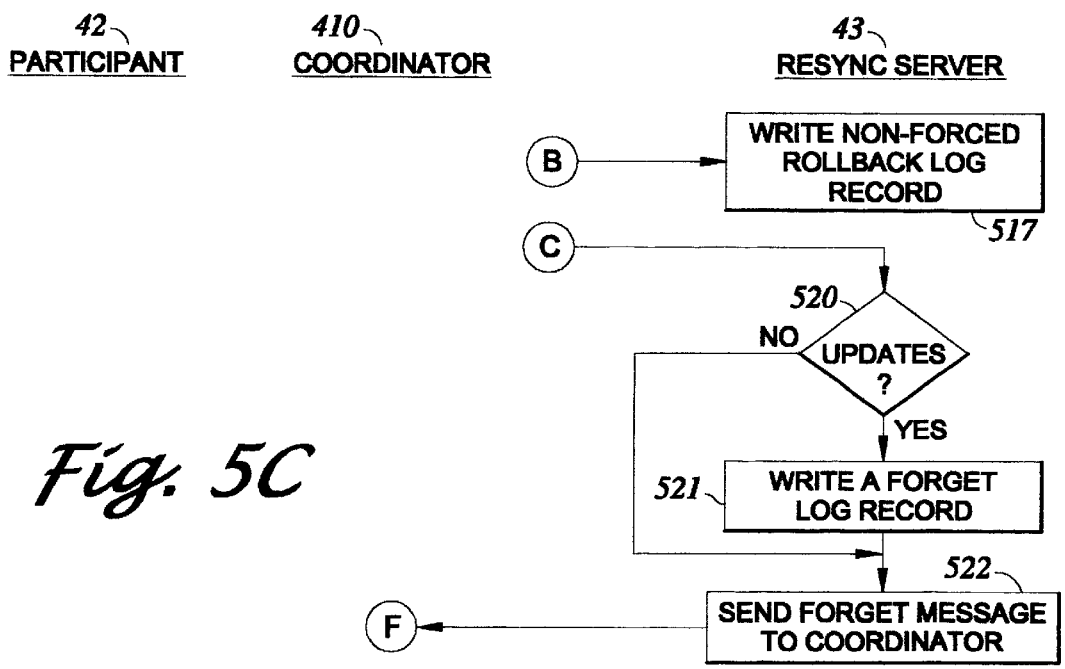
Figure 6:
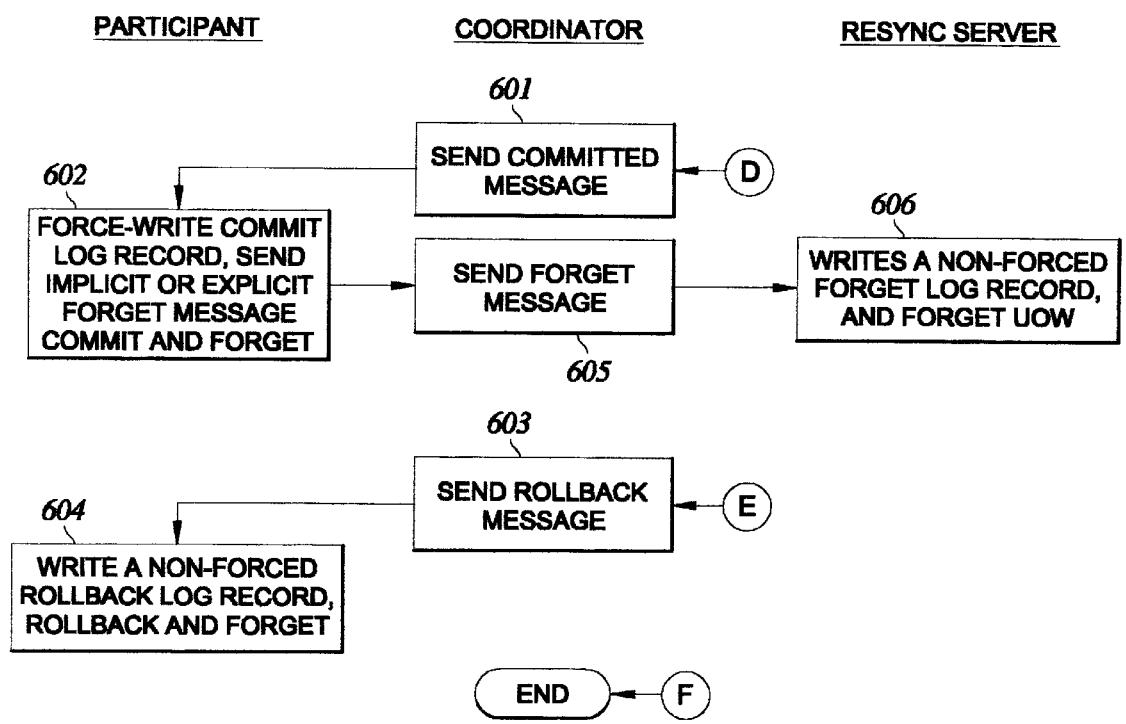
FIG. 6 illustrates the method and program steps of the system components during the second phase of the two-phase commit processing.

The system, method, and programs used by a coordinator to provide two-phase commit at a client with no log is more fully described below with reference to FIGS. 5A, 5B, 5C, and FIG. 6. FIGS. 5A, 5B and 5C illustrate the method and program steps of the system components during the first phase, and FIG. 6 illustrates the method and program steps of the system components during the second phase of the two-phase commit protocol.

Migrate Resynchronization Responsibilities (1) Before a coordinator 410 initiates the two-phase commit, one of the connected DBMS servers 43 is chosen to perform resynchronization on behalf of the coordinator 410, step 501. The chosen DBMS server 43 is called the "resync server."

(2) The coordinator 410 sends a migrate resync message to the resync server 43, step 502.

(3) The resync server 43 replies with the resync migrated message, step 503. If a failure occurs sending the resync migrated message, step 504, the unit of work is rollbacked and forgotten, step 505.

First Phase of Commit (4) The coordinator 410 initiates the two-phase commit, by sending the prepare to commit message 1 to all participants 42, except the resync server, step 506. The prepare to commit messages include the network address of the resync server to be used to perform resynchronization if the commit fails.

(5) After the coordinator receives the votes from all the participants, steps 523, 507, it sends the outcome of the first-phase to the resync server, steps 508, 568, 598.

(a) If at least one participant voted request to commit and no participants voted rollback or no communication errors occurred, step 509, the coordinator sends the request to commit message to the resync server with a list of all the DBMS servers that voted request to commit.

(b) If any participant voted rollback or a communication error occurred while sending a prepare to commit message, step 516, the coordinator sends a rollback message to the resync server and all participants who responded request to commit. There is no second phase.

(c) If all participants voted forget, step 519, each DBMS server is read-only and does not participate in the second phase of commit, the coordinator sends the request to commit message to the resync server with an empty list of DBMS servers that voted request to commit.

(6a) The resync server receives the request to commit message, and force-writes a commit log record with the list of participants participating in the two-phase commit, step 510 (FIG. 5B). The committed message is sent to the coordinator with the committed message, step 511 (FIG. 5B). The resync server is in the "committing" state.

If a failure occurs, step 512 (FIG. 5B), between the coordinator and the resync server while the resync server is in the "committing" state, the commit may be left in a state such that one of the other participants does not know whether to commit or rollback. The resync server must remember the units of work in the committing state which can be determined by reading the commit records in the log.

After recovering from the failure and determining all units of work in the "committing" state, the resync server periodically tries to resynchronize with each of the other participants that voted request to commit, step 513 (FIG. 5B).

After resynchronization is completed, step 514 (FIG. 5B), for all the participants, the resync server writes a non-forced forget log record and forgets the unit of work, step 515 (FIG. 5B). The resync server is no longer in the "committing" state.

(6b) The resync server receives the rollback message, and writes a non-forced rollback log record, step 517 (FIG. 5C).

(6c) The resync server receives the request to commit message. If the resync server performed any updates, step 520 (FIG. 5C), it writes a forget log record, step 521 (FIG. 5C). In either the read-only or update case, the resync server sends the forget message to the coordinator to complete the commit, step 522 (FIG. 5C).

Second Phase of Commit (7a) The coordinator sends each of the participants, except the resync server, the committed message, step 601 (FIG. 6). The participant force-writes a commit log record, sends an explicit or implied forget message to the coordinator, commits the unit of work, and forgets it, step 602 (FIG. 6).

In a preferred embodiment, the coordinator can specify whether the coordinator wants an implied or explicit forget from the participant. If an implicit forget is desired, then the next SQL request from the participant implies the forget.

(7b) The coordinator sends each of the participants, except the resync server, the rollback message, step 603. The participant writes a non-forced rollback log record, rollbacks the unit of work, and forgets it, step 604.

(8a) After receiving the forget responses (either explicitly or implicitly) from all the participants, the coordinator sends a forget message to the resync server, step 605 (FIG. 6).

(9a) The resync server writes a non-forced forget log record, and forgets the unit of work, step 606. The resync server is no longer in the "committing" state.

Sync Point Overview

The above described system, method and program is implemented in a preferred embodiment using Sync Point verbs as used and described for SNA in Systems Network Architecture LU 6.2 Reference: Peer Protocols, Document Number SC31-6808-1, IBM Corporation, Jun. 15, 1990. DRDA connections use SNA LU6.2 protected conversations to provide resource recovery in the event of a failure during commit processing. The protected conversations use the two-phase commit message flows presented herein to coordinate commits across any network protocol.

DRDA defines a Sync Point Manager (SYNCPTMCR) as a manager that coordinates resource recovery of units of work associated with recoverable resources at multiple application servers. The details of the SYNCPTMGR are defined by SNA. Extensions to SYNCPTMGR are provided herein to support a new set of DDM (Distributed Data Management) commands and replies outside of the Communications Sync Point Manager (CMNSYNCPT) to coordinate commit and rollback, keep track and log units of work state information, and initiate resynchronization after a system or communications failure.

Figure 7:
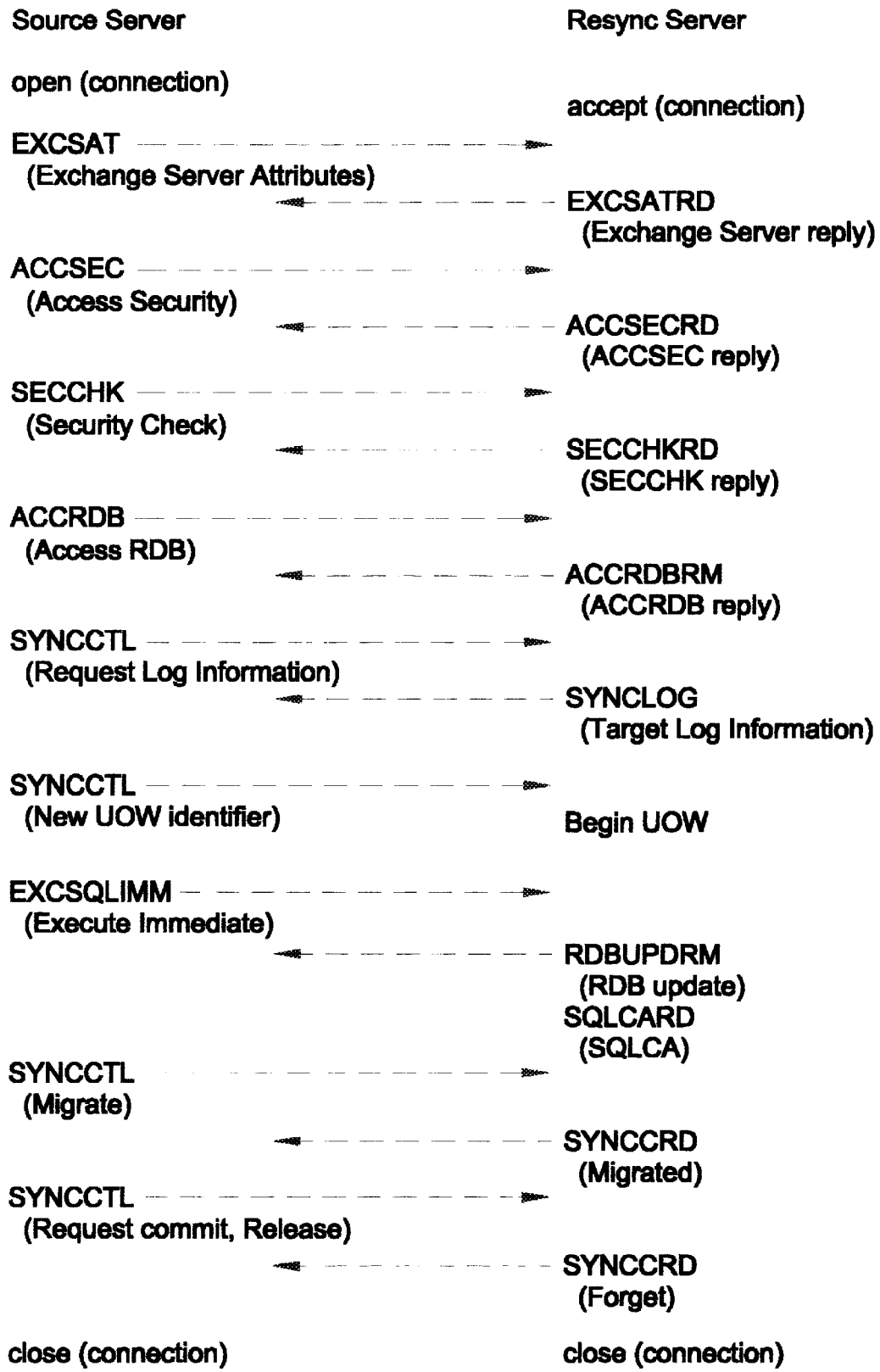
FIG. 7 shows the resync server flow of this invention.

FIG. 7 shows the resync server flow where there is a single server with updates. A new SYNCLOG object is used by the SYNCPTMGRs to exchange log information. A new SYNCCTL request is used to perform the sync point protocols.

Sync Point Commands and Object

The preferred embodiment of this invention includes two new commands, the sync point control command (SYNCCTL) and the sync point resync command (SYNCRSY). Also included is a new data object, the sync point log (SYNCLOG). For a detail description on the new sync point commands and objects refer to "Sync Point Commands" below.

Sync Point Log Object

The purpose of this object is to provide log and resynchronization information to the source SYNCPTMGR and target SYNCPTMGR. This information is used to perform resynchronization if a system or communication failure occurs during the second-phase of commit processing. The object contains the following information: log name, log timestamp, and resynchronization network address.

Sync point log and resynchronization information is required to be provided by each sync point manager (SYNCPTMGR). If an EXCSAT command requests a SYNCPTMGR level that supports 2-phase, the target SYNCPTMGR provides the sync point log object as a reply to the request log sync point control command. The source SYNCPTMGR or the resync server, if the unit of work is migrated, sync point log object is sent to each participant SYNCPTMGR in the current unit of work on the prepare sync point control command. A list of sync point log objects is sent to the resync server on the request_commit sync point control command. The list contains each of the participant SYNCPTMGR's sync point log object that replied request_commit on the sync point control reply.

Log names should be unique. It is recommended that the log name be generated by concatenating a unique network name like the domain host name with the resynchronization network address.

Logs should not be deleted while resync work remains to be completed. To identify this situation, a log timestamp is required. The timestamp is generated at the time the log is created. If a log name is received with a log timestamp having a different time value than the previous log timestamp, the log is considered cold or new. In all other cases, the log is considered warm. If two SYNCPTMGRs use mismatching logs or resync to the wrong SYNCPTMGR, data inconsistencies can occur since the log is different than what was being used during commit processing.

SYNCPTMGR log names and resynchronization network addresses are required to be logged by each SYNCPTMGR with a log. After a system failure, the log is read to determine the units of work that require resynchronization, the log name used at the time of the commit, and where to connect to perform resynchronization.

When a source SYNCPTMGR does not have a log, the resync server's log and resync information is used to create its sync point log object. This causes the target SYNCPTMGR to perform resynchronization with the resync server and not the source SYNCPTMGR.

Sync Point Control Command and Reply

When an application issues a commit or rollback, sync point control messages are exchanged between the source SYNCPTMGR and all target SYNCPTMGRs to perform the two-phase commit. The source SYNCPTMGR is the coordinator of the 2-phase commit. The target SYNCPTMGR is the participant SYNCPTMGR of the 2-phase commit. The sync point control message consists of the following types:

Sync Point Control Command:
  prepare—solicits request commits. (to participant)
  request_commit—solicits committed. (to resync server)
  committed—unit of work is committed. (to participant)
  forget—unit of work is complete. (to participant or resync server)
  rollback—unit of work is backed out. (to participant)
  migrate—migrate resynchronization responsibilities. (to participant)
  uowid—current unit of work identifier. (to participant)

Sync Point Control Reply:
  committed—unit of work is committed. (from resync server)
  migrated—resynchronization responsibilities migrated. (from resync server)
  request_commit—solicits committed. (from participant)
  rollback—unit of work is backed out. (from resync server)
  forget—unit of work is complete. (from participant or resync server)

A connection participates in a commit or rollback if the sync point identifier was sent in the current unit of work. To disconnect a connection, a successful commit must be performed with the release indicator set in the prepare message. After the commit completes, the connection is closed.

Sync Point Unit of Work Identifier

The sync point unit of work identifier is maintained by the source SYNCPTMGR. The uowid sync point control command is chained with the next DDM command after a successful commit or rollback. When this object is received by a target SYNCPTMGR, the SYNCPTMGR is part of the current unit of work and participates in any commit or rollback.

Source SYNCPTMGR with no log.

When the source SYNCPTMGR acting as the coordinator does not have a log and decides to commit a unit of work, it migrates resync responsibilities to a target SYNCPTMGR called the "resync server". To migrate, the migrate sync point control message is sent to a target SYNCPTMGR participating in the current unit of work. The resync server acknowledges the migrate request by sending the migrated sync point control reply. The target SYNCPTMGR is the resync server for the current unit of work.

The coordinator initiates the first phase of the commit protocol by sending, serially or in parallel, the prepare sync point control messages to all target SYNCPTMGRs acting as participants except the resync server to determine whether they are willing to commit the unit of work. After the coordinator receives the votes from all the participants, it sends the outcome of the first phase to the resync server.

If at least one participant voted "request_commit" and no participants voted "rollback", then the coordinator sends the request_commit sync point control message to the resync server. The message includes a list of sync point log objects received from the participants that voted "request_commit". The resync server force-writes a "commit" log record, and acknowledges by sending the committed sync point control message to the coordinator, and commits. The coordinator is in the "committing" state. The coordinator sends each of the other participants the committed sync point control message.

If all participants voted "forget", the coordinator sends the request to commit sync point control message with an empty participant list to the resync server. There is no second phase of the protocol. The resync server writes a "forget" record and sends the forget sync point control reply messages to the coordinator to complete the unit of work.

If a participant voted "rollback", the coordinator sends the rollback sync point control message to the resync server. The resync server writes a non-forced "rollback" log record. The coordinator moves to the "rollback" state and sends the rollback sync point control messages to all participants, except the resync server, who did not vote "rollback" or "forget".

Each participant, after receiving a "committed" message moves to the "committing" state, force-writes a "commit"

log record, sends a forget sync point control response to the coordinator, and then commits the unit of work and forgets it. Each participant, after receiving a "rollback" message moves to the "rollback" state, writes a non-forced "rollback" log record, and backs out the unit of work. The unit of work is forgotten.

The coordinator, after receiving the responses from all the participants that were sent a message in the second phase, sends a forget sync point control response to the resync server. The resync server writes a "forget" record and forgets the unit of work.

A resynchronization race condition may occur if a participant can not send the request_commit sync point control reply. In this case, the participant is indoubt and is required to perform resynchronization with the resync server. The race condition occurs when the resync server tries to process the sync point resync request before receiving the request_commit sync point control message or a rollback sync point control message from the coordinator. The resync server may decide to immediately rollback the unit of work, wait for the coordinator to send the request to commit/rollback sync point control message, or reply with the commit state of unknown. If the resync server returns with a commit state unknown, the participant must retry until the resync server replies with the commit decision.

If a communication error occurs during the processing of the request_commit sync point control messages between the coordinator and the resync server, the commit decision is not known by the coordinator. In this case, the coordinator has to return a non-zero sqlstate identifying that the commit decision is unknown.

Logging and Sync Point States

In order to maintain protected resources in consistent states even if a failure occurs during commit processing, the SYNCPTMGR logs unit of work state information in nonvolatile storage. The logged state information represents the point reached in the sync point operation, the characteristics of the protected resources, and the role of the local SYNCPTMGR (source or target). From the logged information, the SYNCPTMGR can determine the right actions to take following recovery from a system failure to return the resources to a consistent state.

There are two ways to write information to nonvolatile storage—forced write and nonforced write. A forced write operation does not complete until the information is written to storage. A nonforced write completes when the information is put into log buffers. Forced write operations take longer to complete, but the information is guaranteed to be available following a system failure.

Sync point state tables are defined below which are used to determine when log records are to be written and when the unit of work is indoubt. If a unit of work is indoubt and the commit operation fails, the SYNCPTMGR is required to start resync protocols to resolve the indoubt. After a system failure occurs, the log is read, the state of indoubt units of work are recreated, and resynchronization is initiated.

Source Sync Point Manager without Log
Commit Flow

Figure 8:
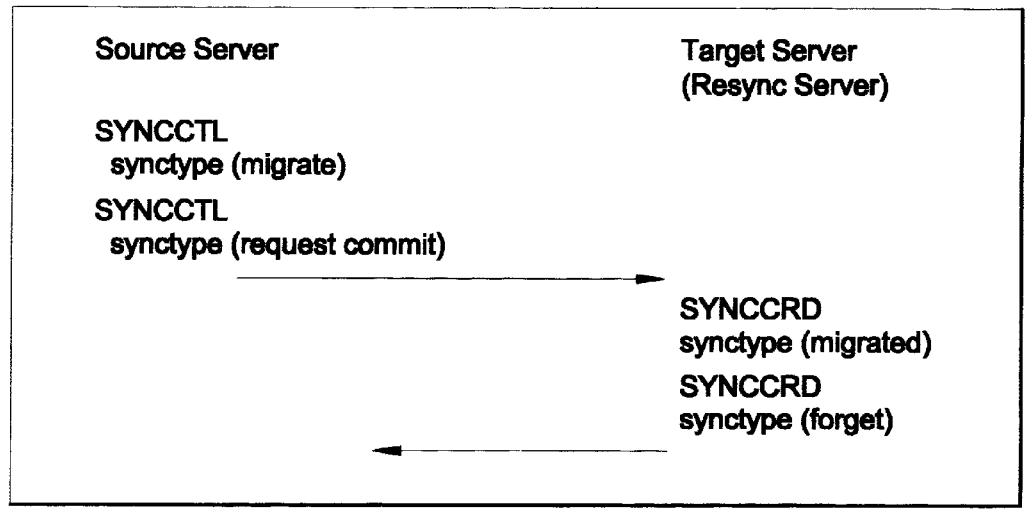
FIG. 8 shows the message flows illustrating the commit processing when the client does not have a log.

The message flows shown in FIG. 8 illustrate the commit processing when the source SYNCPTMGR does not have a log. The target server is the only target server involved in the transaction and by default is the resync server.

Rollback Flow

Figure 9:
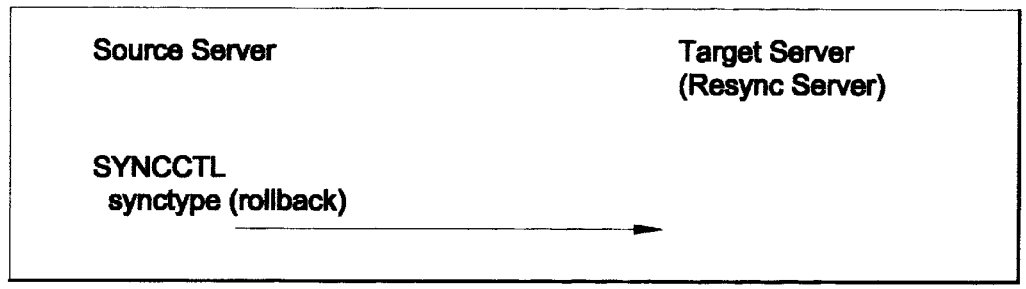
FIG. 9 illustrates the two-phase sync point control message exchange to perform a rollback.

FIG. 9 illustrates the sync point control message to perform a rollback.

Multiple Connections: Source SYNCPTMGR with no log

Figure 10A:
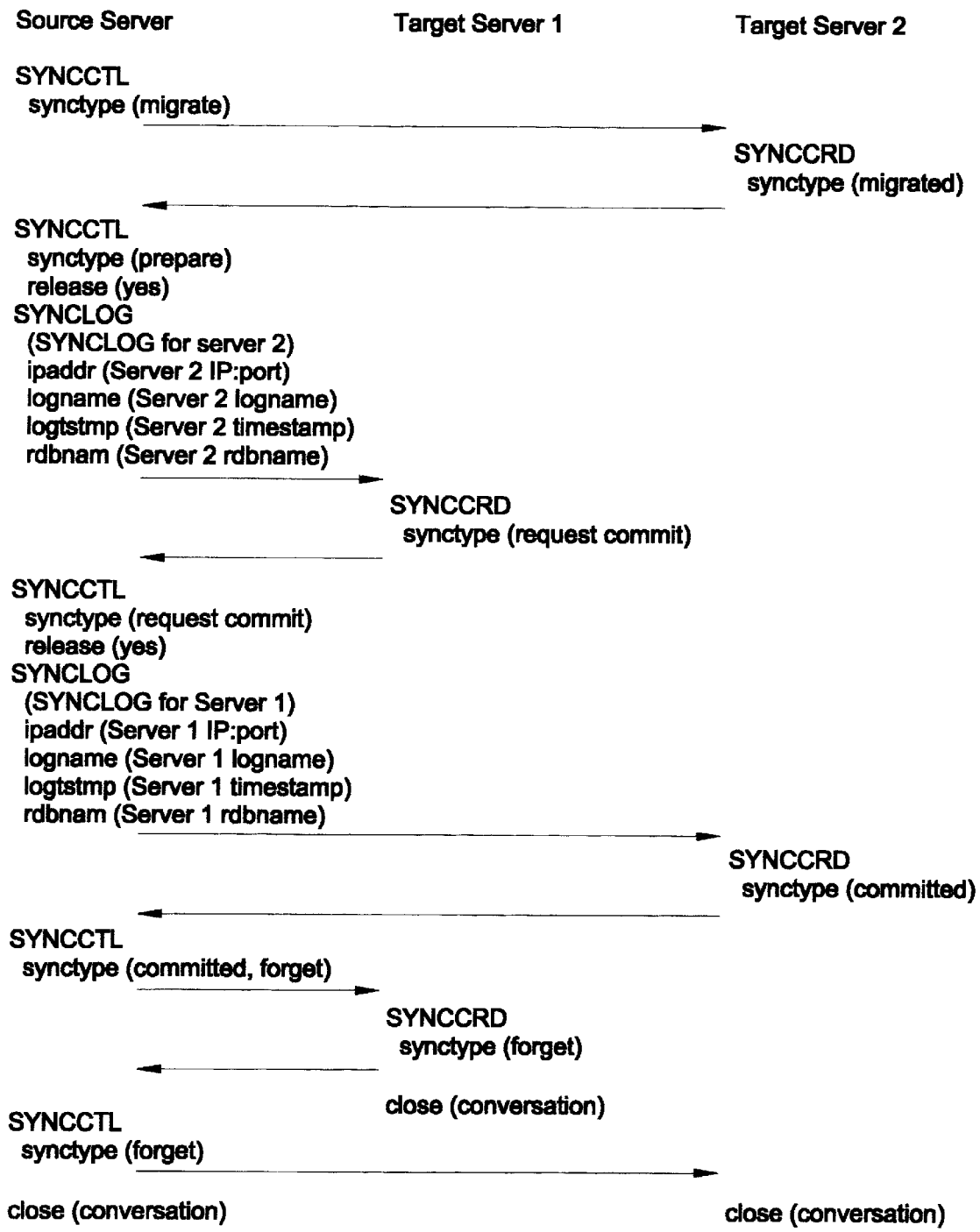
FIG. 10A illustrates the commit processing between a source server without a log and two target servers where server 2 is designated as the resync server, and where the outcome of the unit of work is commit.

FIG. 10A shows multiple released connections commit flow. FIG. 10A illustrates the commit processing between a source server without a log and two target servers where server 2 is designated as the resync server. The SYNCCTL request to commit command contains a list of the participant's SYNCLOG objects that voted to commit. The list allows the resync server to know the possible SYNCPTMGRs that may attempt to resync. Since the outcome of the unit of work is commit, the conversation is terminated.

Figure 10B:
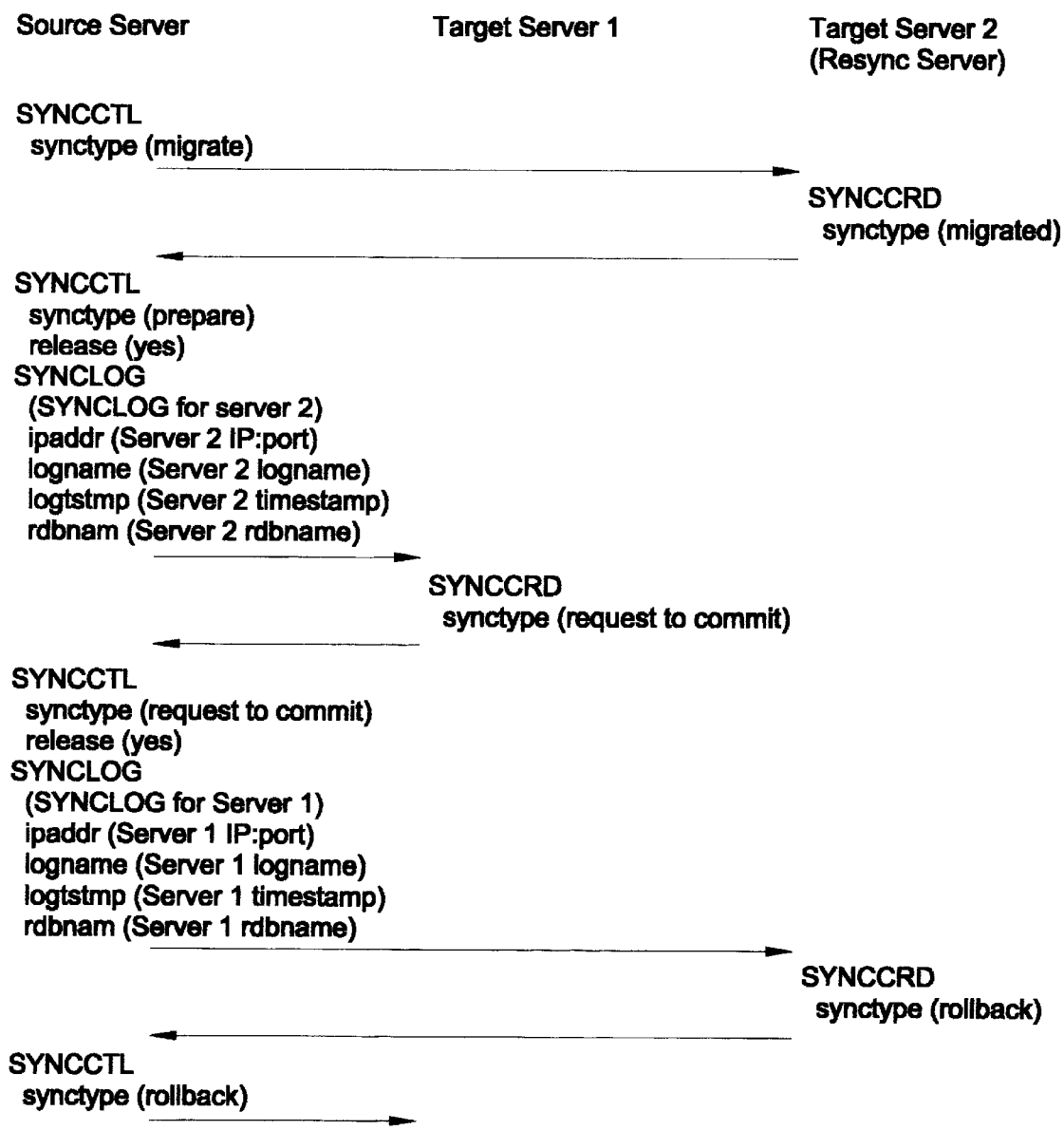
FIG. 10B illustrates the commit processing between a source server without a log and two target servers where server 2 is designated as the resync server, and where one of the servers voted rollback.

FIG. 10B shows multiple released connections rollback flow. FIG. 10B illustrates the commit processing between a source server without a log and two target servers where server 2 is designated as the resync server. The migrate SYNCCTL command contains a list of the participant's SYNCLOG objects. The list allows the resync server to know the possible SYNCPTMGRs that may attempt to resync if the commit fails. Even though release was specified on the prepare and request to commit commands, since one of the servers voted rollback, the close conversation is not performed.

Multiple Connections: Source SYNCPTMGR with no log (Race Condition)

Figure 11:
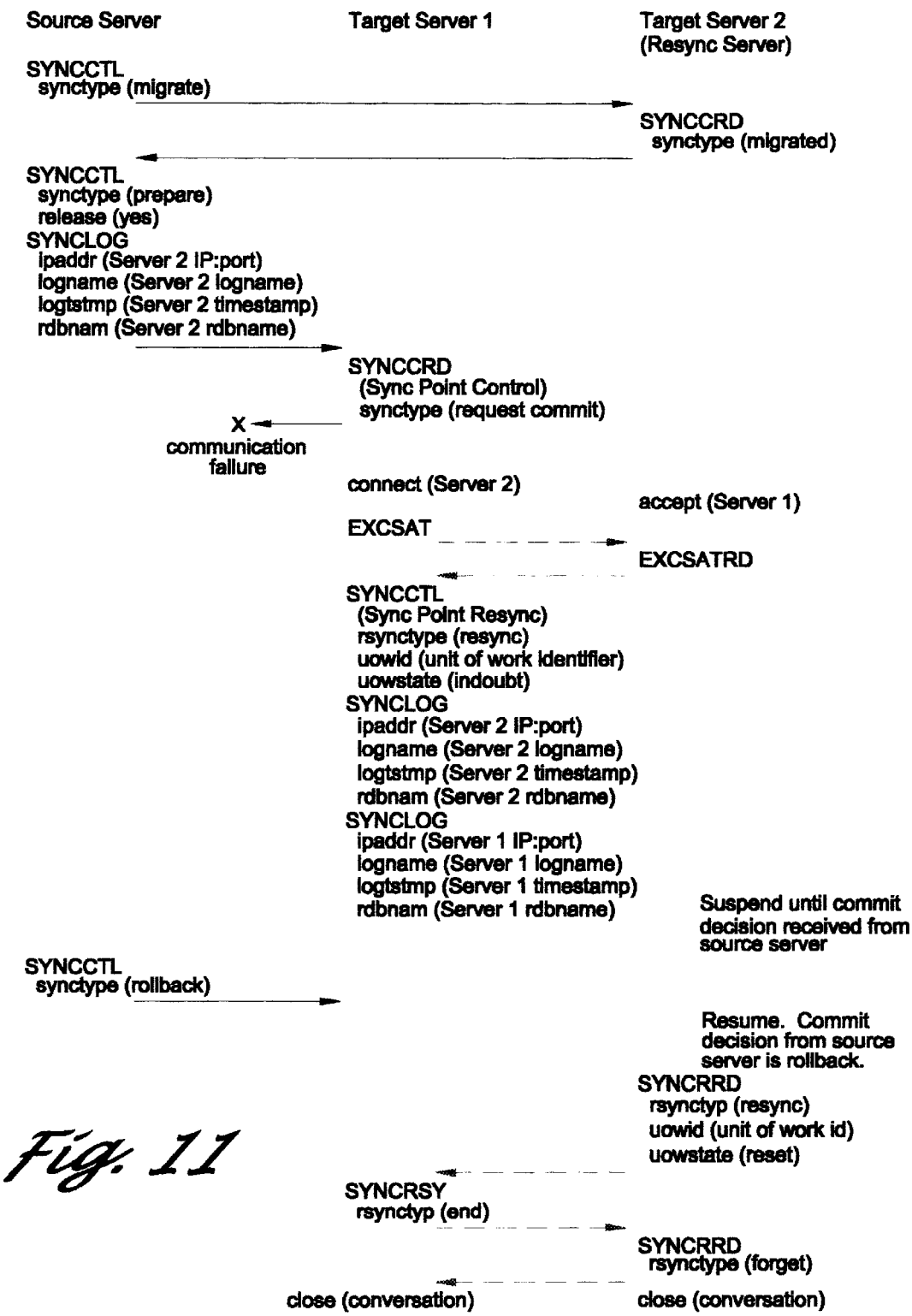
FIG. 11 illustrates the race condition when a participant tries to resync before the resync server knows the outcome of the unit of work.

FIG. 11 illustrates the race condition when a participant tries to resync before the resync server knows the outcome of the unit of work. In the example shown in FIG. 11, the resync server waits for the commit decision before replying to the resync request.

Sync Point Commands
Sync Point Log

The following description identifies the command and reply to exchange log names and determine resynchronization responsibilities.

Sync Point Log Object (SYNCLOG)

The SYNCLOG object defines the log characteristics being used by the SYNCPTMGR. This request is used to provide log information and resynchronization network address. It contains the following parameters:

resync network address (rsyncaddr)—identifies where a SYNCPTMGR should connect to perform resynchronization. For TCP/IP this contains the domain IP address and port number and optionally a domain host name.

The resynchronization network address may change in a DB2 MVS SYSPLEX environment. A DB2 subsystem may be restarted with a different IP address, but the port address does not change and is unique among the DB2 subsystems in a sysplex. If resynchronization is required, the IP address for the DB2 subsystem is obtained from the domain host name contained in the SYNCLOG.

log name (lognam)—the SYNCPTMGR log name. The log name should be unique.

log timestamp (logstmp)—the timestamp generated when the log is created. It allows the SYNCPTMGR to identify if the log is cold or warm. A cold log is determined if this is the first connection to the target SYNCPTMGR using the log. A warm log means that this is not the first connection using the log.

Implied Forget

In a preferred embodiment, an optimization called "implied forget" is used between a participant and the coordinator when the conversation is not to be released after completing the commit. The "implied forget" optimization is such that the forget response to the committed SYNCTL message is deferred. In fact, it is implied via the response to the next DDM request sent to the participant. This optimization saves a message. The coordinator sends the "committed" message with no forget but does not wait for a response. The participant receives and processes the message but does not generate a response. It waits for the next DDM request.

The source SYNCPTMGR without a log must maintain knowledge of a unit of work until all implied forgets and forget sync point control messages are received from each participant. As soon as all "forget" messages are received, the forget SYNCCTL command is sent to the resync server while processing the next commit.

Figure 12:
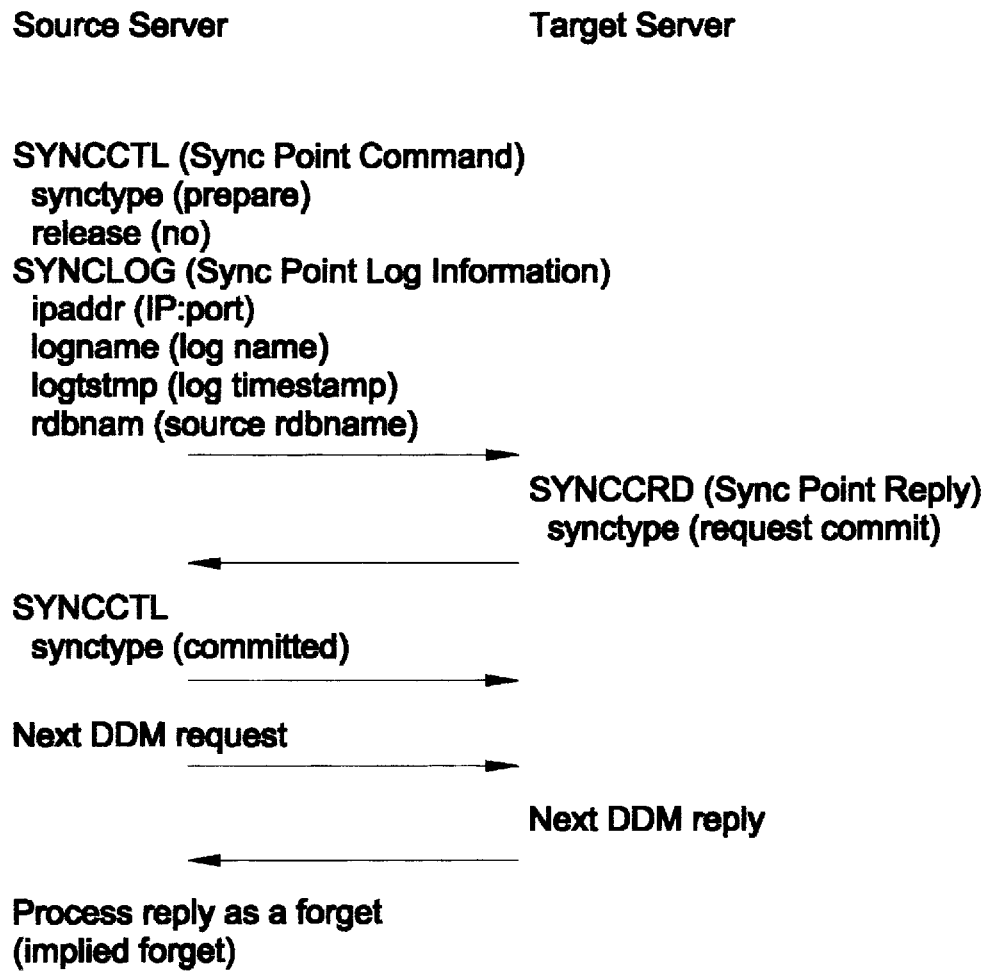
FIG. 12 illustrates a commit using an implied forget flow.

FIG. 12 illustrates a commit using an implied forget flow. This flow illustrates the three sync point control messages that are exchanged when a unit of work has updated resources at the target server. Since the conversation is not marked for release, implied forget processing is used to acknowledge that commit has completed.

Sync Point Resynchronization

The following description identifies the command and reply to perform resynchronization after a system or network failure during commit or rollback processing.

Sync Point Resync Command (SYNCRSY)

The SYNCRSY command exchanges the state of a unit of work between two SYNCPTMGRS. With this command, the coordinator and participant SYNCLOG objects must be sent with the same request. This command is used to perform resynchronization between the two SYNCPTMGRS. The source SYNCPTMGR sends the state of the unit of work. The target SYNCPTMGR returns the state of the unit of work. After completing the exchange, the unit of work is completed and forgotten. It contains the following parameters:

unit of work identifier (uowid)—identifies the unit of work.

type (uow or end)—identifies type of resync request. Identifies a resync request or the end of a list of resync requests. If type end is specified, no other parameters are permitted on the command.

log name (lognam)—the SYNCPTMGR log name. The log name should be unique.

log timestamp (logstmp)—the timestamp generated when the log is created. It allows the SYNCPTMGR to identify if the log is cold or warm. A cold log is determined if this is the first connection to the target SYNCPTMGR using the log. A warm log means that this is not the first connection using the log.

unit of work state (uowstate)—identifies the state of the unit of work, either commit, unknown, or reset.

Sync Point resync Reply (SYNCRSYRD)

The SYNCRSYRD completes the state of a unit of work exchange. It is used by a SYNCPTMGR to complete resynchronization. It contains the following parameters:

unit of work identifier (uowid)—identifies the unit of work.

type (uow or forget)—identifies type of resync reply. Identifies a reply to a resync request to an end of a list of resync requests. If type end is specifies on the SYNCRSY, type forget must be specified and no other parameters are permitted on the command.

log name (lognam)—the SYNCPTMGR log name. The log name should be unique.

log timestamp (logstmp)—the timestamp generated when the log is created. It allows the SYNCPTMGR to identify if the log is cold or warm. A cold log is determined if this is the first connection to the target SYNCPTMGR using the log. A warm log means that this is not the first connection using the log.

unit of work state (uowstate)—identifies the state of the unit of work, either reset, committed, unknown, in-doubt, or cold.

RESET indicates that a SYNCPTMGR has no information about a unit of work. This may occur when the unit of work was rolled back or was committed and forgotten.

COMMITTED indicates that the unit of work is in the commit state.

UNKNOWN indicates that the outcome of the unit of work is unknown because the unit of work is still in progress and has not reached a commit decision at the resync server.

IN-DOUBT indicates that the outcome of the unit of work is in-doubt because the unit of work has entered phase 1 of commit processing but the SYNCPTMGR has not been informed of the final outcome of the unit of work.

COLD indicates that a cold start was performed and the log needed for recovery is no longer accessible.

Sync Point Control

The following identifies the command and reply used to perform commit or rollback processing.

Sync Point Control Command (SYNCCTL)

The SYNCCTL command conveys sync point information to the target SYNCPTMGR. It contains the following parameters:

type—migrate, prepare, request—commit, committed, or forget.

release—yes, or no. Valid for the following sync point control types: prepare or request_commit. If yes, close connection after successful completion of the commit else prepare to process next request or reply.

forget—yes, or no. Valid only for committed. If yes, an explicit forget is requested by a coordinator.

Sync Point Control Reply (SYNCCTLRD)

The SYNCCTL reply conveys sync point information to the source SYNCPTMGR. It contains the following parameters:

type—migrated, request_commit, committed or forget.

Sync Point Identifier

The following identifies the object used to identify that the target SYNCPTMGR is participating in the current unit of work.

Sync Point Identifier Object (SYNCID)

The SYNCPTID is sent with the next command after a successful commit or rollback. When this object is received by a target SYNCPTMGR, the SYNCPTMGR is part of the current unit of work and participates in any commit or rollback.

unit of work identifier (uowid)—this identifies the current unit of work. The uowid is defined as the correlation token (crrtkn) concatenated with the commit count.

Log Formats

Committed Log Record

A committed log record is written by the resync server if no participants voted rollback and at least one participant voted request_commit. This record is forced and identifies the transition between phase 1 and phase 2 of the committed unit of work.

The log record contains the following set of objects:

SYNCLOG for each participant that voted request_commit.

SYNCID of the unit of work that has committed.

Forget Log Record

A forget log record is written by the resync server after receiving a forget sync point control message from each participant that voted request-commit or resynchronization was performed with each participant that voted request_commit. This record is non-forced and identifies the end of phase 2 of the committed unit of work.

The log record contains the following set of objects:

SYNCLOG for each participant that voted request_commit.

SYNCID of the unit of work that has committed.

Prepared Log Record

A prepared log record is written by a participant after voting to request_commit the unit of work. This record is forced and written during phase 1. This log record marks the unit of work as indoubt. If a failure occurs that prevents the participant from obtaining the outcome of the unit of work, resynchronization is required to be performed.

The log record contains the following set of objects:
SYNCLOG of the coordinator.
SYNCID of the unit or work that is indoubt.

Commit Log Record

A commit log record is written by a participant after receiving a committed sync point control message from the coordinator. This record is forced. This log record marks the completion of the committed unit or work.

The log record contains the following set of objects:
SYNCLOG of the coordinator.
SYNCID of the unit of work that has committed.

Rollback Log Record

A rollback log record is written by a participant after receiving a rollback sync point control message from the coordinator. This record is forced. This log record marks the completion of the unit of work that has been rollbacked.

The log record contains the following set of objects:
SYNCLOG of the coordinator.
SYNCID of the unit of work that has been backed out.

Using the foregoing specification, the invention may be implemented as a machine, process, or article of manufacture using standard programming and/or engineering techniques using computer programming software, firmware, hardware or any combination or subcombination thereof. For example, the system of the invention as disclosed in FIG. 4 utilizes well-known system components that may not be specifically set out in the figure. Some of these system components may be modified or under the control of a program as specified herein in order to embody the invention herein. For example, means for coordinating a two-phase commit procedure independently of logging includes well known message passing hardware, firmware and software as modified herein. Likewise, means for sending and receiving the various messages involves the use of well-known communication hardware, firmware and software as controlled and modified herein. Means for writing logs, committing, rolling back, and forgetting also involve the use of well-known storage devices and other hardware, firmware, and software as controlled and modified herein.

Any resulting program(s), having computer readable program code, may be embodied within one or more computer usable media such as memory devices or transmitting devices, thereby making a computer program product, i.e., an article of manufacture, according to the invention. Memory devices include, but are not limited to, fixed (hard) drives, disks, diskettes, optical disks, magnetic tape, semiconductor memories such as ROM, Proms, etc., or any other memory device. Transmitting devices include, but are not limited to, the internet, electronic bulletin board and message/note exchange, telephone/modem based network communication, hard-wired/cabled communication network, cellular communication, radio wave communication, satellite communication, and other stationary or mobile network systems/communication links.

A machine embodying the invention may involve one or more processing systems including, but not limited to, cpu, memory, storage devices, communication links, communication/transmitting devices, servers, I/O devices, or any subcomponents or individual parts of one or more processing systems, including software, firmware, hardware or any combination or subcombination thereof, which embody the invention as set forth in the claims.

Making, using, or selling a machine, process, or article of manufacture embodying the invention may involve one or more of the following: executing program code directly from one medium, storing program code onto a medium, copying the code from one medium to another medium, or transmitting the code using a transmitting device. Each one of these may involve the use of a memory or transmitting device which only embodies program code transitorily as a preliminary or final step in making, using or selling the invention.

One skilled in the art of computer science will easily be able to combine the software created as described with appropriate general purpose or special purpose computer hardware to create a computer system and/or computer subcomponents embodying the invention and to create a computer system and/or computer subcomponents for carrying out the method of the invention.

While the preferred embodiment of the present invention has been illustrated in detail, it should be apparent that modifications and adaptations to that embodiment may occur to one skilled in the art without departing from the spirit or scope of the present invention as set forth in the following claims. For example, some modifications and adaptations may include, but are not limited to, the following:

user input may be received from the keyboard, mouse, pen, voice, touch screen, or any other means by which a human can input data to a computer, including through other programs such as application programs;

means for sending and receiving messages may be implemented using message passing models or using shared memory or shared disk techniques; and DBMS servers may be relational, objected-oriented, or other types of database management systems.

We claim:

1. A method of performing a two phase commit procedure for a transaction between a coordinator and a plurality of database management systems (DBMS's) participating in the transaction; the method comprising:

coordinating the two-phase commit procedure, at the coordinator, independently of a logging step required to guarantee the outcome of a unit of work, including when at least one participant of the plurality of DBMS's votes to commit; and migrating resynchronization responsibilities for the two-phase commit procedure from the coordinator to a DBMS selected as a resync server.

2. The method of claim 1 further comprising the step of performing a logging step, during the two-phase commit procedure, at the resync server.

3. A method of performing a two-phase commit procedure for a transaction between a coordinator and a plurality of database management systems (DBMS's) participating in the transaction; the method comprising:

selecting, by the coordinator, a DBMS server as a resync server to perform resynchronization for the two-phase commit procedure on behalf of the coordinator;

initiating, by the coordinator, the two-phase commit procedure by sending a "prepare to commit" message to each DBMS participating in the transaction as a participant except the resync server;

coordinating the two-phase commit procedure, at the coordinator, independently of a logging step required to guarantee the outcome of a unit of work, including when at least one participant of the plurality of DBMS's votes to commit; and sending, by the coordinator, an outcome message to the resync server after receiving votes from each participant.

4. The method of claim 3 further comprising receiving a "migrated resync" message from the resync server after the resync server has been selected.

5. The method of claim 3 further comprising rolling back and forgetting a unit of work if a failure occurs during a transmission of a "migrated resync" message from the resync server to the coordinator after the resync server has been selected.

6. The method of claim 3 wherein the "prepare to commit" message includes a network address of the resync server.

7. The method of claim 3 wherein the outcome message sent to the resync server is a "commit" message with a list of all participants that voted "request to commit".

8. The method of claim 7 further comprising force-writing, by the resync server, a "commit" log record with the list of participants and sending a "committed" reply message to the coordinator.

9. The method of claim 8 further comprising reading, by the resync server, one or more commit log records if a failure occurs between the coordinator and the resync server after the "committed" reply message is sent to the coordinator from the resync server; and periodically attempting to resynchronize, by the resync server, with each participant voting to commit after recovering from the failure and determining all "commits" from reading the "commit" log records.

10. The method of claim 9 further comprising writing, by the resync server, a non-forced "forget" log record after resynchronization is complete with each participant; and forgetting, by the resync server, the unit of work.

11. The method of claim 8 further comprising sending, by the coordinator to each participant, except the resync server, that returned a non-read-only vote, a "committed" message.

12. The method of claim 11 further comprising force-writing, by each participant that received the "committed" message, a "commit" log record; sending to the coordinator a message indicating forget; committing the unit of work; and forgetting the unit of work.

13. The method of claim 12 wherein the message indicating forget is an explicit "forget" message.

14. The method of claim 12 wherein the message indicating forget is an implicit "forget" message where a next reply message from a corresponding participant to the coordinator implies a forget.

15. The method of claim 12 further comprising sending a "forget" message from the coordinator to the resync server after a message indicating forget is received from each participant that received the "committed" message.

16. The method of claim 15 further comprising writing, by the resync server, a non-forced "forget" log record; and forgetting the unit of work.

17. The method of claim 3 wherein the outcome message is a "rollback" message.

18. The method of claim 17 wherein the "rollback" message is sent to each participant voting "request to commit."

19. The method of claim 18 further comprising writing, by each participant that received the "rollback" message, a non-forced "rollback" log record; rolling back the unit of work; and forgetting the unit of work.

20. The method of claim 17 further comprising writing, by the resync server, a non-forced "rollback" log record after receiving the "rollback" message from the coordinator.

21. The method of claim 3 wherein the outcome message is a "request to commit" message if each participant voted to forget.

22. The method of claim 21 wherein each participant is read-only and does not participate with the coordinator during a second phase of the commit procedure.

23. The method of claim 21 further comprising writing, by the resync server, a "forget" log record after receiving the "request to commit" message from the coordinator if the resync server performed any updates; and sending to the coordinator from the resync server a "forget" reply message if the resync server performed updates or performed read-only.

24. The method of claim 3 wherein the outcome message is a "request to commit" message with a list of each participant voting to commit if at least one participant voted to commit and no participant voted to rollback and each previous communication was free of error.

25. The method of claim 3 wherein the outcome message is a "rollback" message if any participant voted to rollback or a communication error occurred while sending the "prepare to commit" message.

26. A system for performing a two-phase commit procedure for a transaction between a coordinator and a plurality of database management systems (DBMS's) participating in the transaction as participants; the system comprising:
the coordinator having means for coordinating the commit procedure independently of a logging function required to guarantee the outcome of a unit of work, including when at least one participant of the plurality of DBMS's votes to commit; and
a DBMS server, communicatively connected to the coordinator and each participant, and designated as a resync server by the coordinator, for performing a logging function during the commit procedure and for performing resynchronization if the commit procedure fails.

27. A system for performing a two-phase commit procedure for a transaction between a coordinator and a plurality of database management systems (DBMS's) participating in the transaction; the system comprising:
means for selecting, by the coordinator, a DBMS server as a resync server to perform resynchronization for the two-phase commit procedure on behalf of the coordinator;
means for initiating, by the coordinator, the two-phase commit procedure by sending a "prepare to commit" message to each DBMS participating in the transaction as a participant except the resync server;
means for coordinating the two-phase commit procedure, at the coordinator, independently of a logging function required to guarantee the outcome of a unit of work, including when at least one participant of the plurality of DBMS's votes to commit;
means for sending, by the coordinator, a "request to commit" message to the resync server after receiving votes from each participant if at least one participant voted to commit and no participant voted to rollback;
means for receiving, by the coordinator from the resync server, a "commit" message;
means for sending, by the coordinator to each participant, except the resync server, that returned a non-read-only vote, a "committed" decision message; and
means for sending a "forget" message to the resync server.

28. The system of claim 27 wherein the "prepare to commit" message includes a network address of the resync server.

29. The system of claim 27 further comprising means for writing a non-forced "forget" log record and means for forgetting the unit of work, by the resync server, after the "forget" message is sent to the resync server.

30. The system of claim 27 wherein the "request to commit" message includes a list of each participant voting to commit.

31. The system of claim 27 further comprising means for force-writing, by the resync server, a "commit" log record with the list of participants after receiving the "request to commit" message.

32. The system of claim 31 further comprising means for force-writing, by each participant that received the "committed" decision message, a "commit" log record; means for committing the unit of work; and means for forgetting the unit of work.

33. A system for performing a two-phase commit procedure for a transaction between a coordinator and a plurality of database management systems (DBMS's) participating in the transaction; the system comprising:

means for selecting, by the coordinator, a DBMS server as a resync server to perform resynchronization for the two-phase commit procedure on behalf of the coordinator;

means for initiating, by the coordinator, the two-phase commit procedure by sending a "prepare to commit" message to each DBMS participating in the transaction as a participant, except the resync server;

means for coordinating the two-phase commit procedure, at the coordinator, independently of a logging function required to guarantee the outcome of a unit of works including when at least one participant of the plurality of DBMS's votes to commit;

means for sending, by the coordinator, a "rollback" message to the resync server after receiving votes from each participant and at least one participant voted to rollback or a communication error occurred while sending the "prepare to commit" message; and means for sending, by the coordinator to each participant, except the resync server, that returned a non-read-only vote, a "rollback" decision message.

34. The system of claim 33 further comprising means for writing, by the resync server, a non-forced "rollback" log record after receiving the "rollback" message from the coordinator.

35. The method of claim 33 further comprising means for writing, by each participant that received the "rollback" decision message, a non-forced "rollback" log record; means for rolling back the unit of work; and means for forgetting the unit of work.

36. A system for performing a two-phase commit procedure for a transaction between a coordinator and a plurality of database management systems (DBMS's) participating in the transaction as participants; the system comprising:

a "migrate resynchronization" message, from the coordinator to a DBMS server selected as a resync server to perform resynchronization for the two-phase commit procedure on behalf of the coordinator; and a "prepare to commit" message, sent from the coordinator to each participant, including a network address of the resync server.

37. The system of claim 36 further comprising a "request to commit" message, sent from the coordinator to the resync server, having a list of each participant voting to commit.

38. A system for performing a two-phase commit procedure for a transaction between a coordinator and a plurality of database management systems (DBMS's) participating in the transaction; the system comprising:

a message request, received in a DBMS server selected as a resync server from the coordinator, to perform resynchronization for the two-phase commit procedure on behalf of the coordinator;

a "request to commit" message, received at the resync server from the coordinator, having a list of each participant voting to commit; and means for force-writing a "commit" log record, at the resync server, after receiving the "request to commit" message.

39. The system of claim 38 further comprising means for reading, by the resync server, one or more commit log records if a failure occurs between the coordinator and the resync server after a "committed" reply message is sent to the coordinator from the resync server; and means for periodically attempting to resynchronize, by the resync server, with each participant voting to commit after recovering from the failure and determining all "commits" from reading the commit log records.

40. The system of claim 39 further comprising means for writing, by the resync server, a non-forced "forget" log record after resynchronization is complete with each participant; and forgetting, by the resync server, the unit of work.

41. A system for performing a two-phase commit procedure for a transaction between a coordinator and a plurality of database management systems (DBMS's) participating in the transaction; the system comprising:

a message request, received at a DBMS server selected as a resync server from the coordinator, to perform resynchronization on behalf of the coordinator;

a "rollback" message, received at the resync server from the coordinator; and means for writing a non-forced "rollback" log record, at the resync server, after receiving the "rollback" message.

42. A program on a computer medium for performing a two-phase commit procedure for a transaction between a coordinator and a plurality of database management systems (DBMS's) participating in the transaction; the program comprising:

means for causing a coordination of the two-phase commit procedure, at the coordinator, independently of a logging function required to guarantee the outcome of a unit of work, including when a "request to commit" message is to be sent from the coordinator; and means for causing a migration of resynchronization responsibilities for the two-phase commit procedure from the coordinator to a DBMS selected as a resync server.

43. A program on a computer usable medium for performing a two-phase commit procedure for a transaction between a coordinator and a plurality of database management systems (DBMS's) participating in the transaction as participants, the program comprising:

means for causing a selection, by the coordinator, of a DBMS server as a resync server to perform resynchronization for the two-phase commit procedure on behalf of the coordinator;

means for causing a coordination of the two-phase commit procedure, at the coordinator, independently of a logging function required to guarantee the outcome of a unit of works including when a "request to commit" message is to be sent from the coordinator;

means for causing a "prepare to commit" message, including a network address of the resync server, to be sent from the coordinator to each participant.

44. A program on a computer usable medium of claim 43 further comprising means for causing a "request to commit" message, to be sent from the coordinator to the resync server, having a list of each participant voting to commit.

45. A program on a computer usable medium for performing a two-phase commit procedure for a transaction between a coordinator and a plurality of database management systems (DBMS's) participating in the transaction as participants; the program comprising:

means for receiving a message request, at a DBMS server selected as a resync server from the coordinator, to perform resynchronization on behalf of the coordinator;

means for receiving a "request to commit" message, at the resync server from the coordinator, having a list of each participant voting to commit; and means for causing a "commit" log record to be force-written, at the resync server, after receiving the "request to commit" message.

46. The program on a computer usable medium of claim 45 further comprising means for causing a reading of, by the resync server, one or more "commit" log records if a failure occurs between the coordinator and the resync server after a "committed" reply message is sent to the coordinator from the resync server; and means for causing a periodic attempt to resynchronize, by the resync server, with each participant voting to commit after recovering from the failure and determining all "commits" from reading the "commit" log records.

47. The program on a computer usable medium of claim 46 further comprising means for causing, by the resync server, a non-forced "forget" log record to be written after resynchronization is complete with each participant; and means for forgetting, by the resync server, the unit of work.

48. A program on a computer usable medium for performing a two-phase commit procedure for a transaction between a coordinator and a plurality of database management systems (DBMS's) participating in the transaction; the program comprising:

means for receiving a message request, at a DBMS server selected as a resync server from the coordinator, to perform resynchronization on behalf of the coordinator;

means for receiving a "rollback" message, at the resync server, from the coordinator; and means for causing a non-forced "rollback" log record to be written, at the resync server, after receiving the "rollback" message.

49. A method of performing a two-phase commit procedure for a transaction between a coordinator and a plurality of database management systems (DBMS's) participating in the transaction; the method comprising:

selecting, by the coordinator, one of the plurality of DBMS's as a resync server to perform resynchronization for the two-phase commit procedure on behalf of the coordinator;

initiating, by the coordinator, the two-phase commit procedure by sending a "prepare to commit" message with a network address of the resync server to each of the DBMS's participating in the transaction participant except the resync server; and coordinating the two-phase commit procedure, at the coordinator, independently of a logging step required to guarantee the outcome of a unit of work, including when a "request to commit" message is to be sent from the coordinator.

50. A system for performing a two-phase commit procedure for a transaction between a coordinator and a plurality of database management systems (DBMS's) participating in the transaction; the system comprising:

means for selecting by the coordinator, one of the plurality of DBMS's as a resync server to perform resynchronization for the two-phase commit procedure on behalf of the coordinator;

means for initiating, by the coordinator, the two-phase commit procedure by sending a "prepare to commit" message with a network address of the resync server to each of the DBMS participating in the transaction participant except the resync server; and means for coordinating the two-phase commit procedure, at the coordinator, independently of a logging function required to guarantee the outcome of a unit of works including when a "request to commit" message is to be sent from the coordinator.

51. A program on a computer usable medium for performing a two-phase commit procedure for a transaction between a coordinator and a plurality of database management systems (DBMS's) participating in the transaction, the program comprising:

means for causing a selection of, by the coordinator, one of the plurality of DBMS's as a resync server to perform resynchronization for the two-phase commit procedure on behalf of the coordinator;

means for causing an initiation of, by the coordinator, the two-phase commit procedure by a sending of a "prepare to commit" message with a network address of the resync server to each of the DBMS's participating in the transaction participant except the resync server; and means for causing a coordination of the two-phase commit procedure, at the coordinator, independently of a logging function required to guarantee the outcome of a unit of work, including when at least one participant of the plurality of DBMS's votes to commit.

* * * * *